US012783607B2

(12) United States Patent
Shanmuganathan et al.

(10) Patent No.: US 12,783,607 B2
(45) Date of Patent: Nov. 3, 2026

(54) DETERMINATION OF RELATED DATA SETS

(71) Applicant: Bedrock Labs, Inc., Menlo Park, CA (US)

(72) Inventors: Ganesha Shanmuganathan, San Jose, CA (US); Pranava Adduri, Seattle, WA (US); Saahil Shenoy, San Francisco, CA (US)

(73) Assignee: Bedrock Labs, Inc., San Mateo, CA (US)

( * ) Notice: Subject to any disclaimer, the term of this patent is extended or adjusted under 35 U.S.C. 154(b) by 21 days.

(21) Appl. No.: 18/303,246

(22) Filed: Apr. 19, 2023

(65) Prior Publication Data

US 2024/0354374 A1 Oct. 24, 2024

(51) Int. Cl.

| | |
|---|---|
| ***G06F 18/231*** | (2023.01) |
| ***G06F 16/22*** | (2019.01) |
| ***G06F 16/2455*** | (2019.01) |
| ***H04L 9/32*** | (2006.01) |

(52) U.S. Cl.

CPC ........ *G06F 18/231* (2023.01); *G06F 16/2255* (2019.01); *G06F 16/24564* (2019.01); *H04L 9/3239* (2013.01)

(58) Field of Classification Search

None

See application file for complete search history.

(56) References Cited

U.S. PATENT DOCUMENTS

| | | | | |
|---|---|---|---|---|
| 2012/0136936 | A1* | 5/2012 | Quintuna | G06F 21/6245 709/204 |
| 2016/0283533 | A1* | 9/2016 | Urmanov | G06F 16/285 |
| 2018/0074786 | A1* | 3/2018 | Oberbreckling | G06F 16/2255 |
| 2021/0406366 | A1* | 12/2021 | Betser | H04L 63/0245 |

OTHER PUBLICATIONS

Das et al. Taaz: A System for Detecting Access Control Misconfigurations. 19th USENIX Security Symposium, pp. 1-16, 2010. (Year: 2010).*

Koutras et al. Valentine: Evaluating Matching Techniques for Dataset Discovery. 2021 ICDE, pp. 468-479. (Year: 2021).*

Eriksson et al. Active Clustering: Robust and Efficient Hierarchical Clustering using Adaptively Selected Similarities. AISTATS 2011, pp. 260-268. (Year: 2011).*

* cited by examiner

*Primary Examiner* — Kieu D Vu

(74) *Attorney, Agent, or Firm* — Van Pelt, Yi & James LLP

(57) ABSTRACT

Determination of related data sets is disclosed, including: analyze a first plurality of columns belonging to a first data set by determining first attributes for each column in the first data set; analyze a second plurality of columns belonging to a second data set by determining second attributes for each column in the second data set; determine a set of common columns belonging to the first data set and the second data set by comparing at least a portion of the first attributes for each column in the first data set to at least a portion of the second attributes for each column in the second data set; and cluster a plurality of data sets including the first data set and the second data set based at least in part on the set of common columns.

20 Claims, 10 Drawing Sheets

DETERMINATION OF RELATED DATA SETS

BACKGROUND OF THE INVENTION

Data sets that are managed by a party can quickly multiply and be stored across various locations. It would be desirable to identify data sets that have similar attributes so that data sets with similar attributes can be treated similarly. However, it is computationally expensive and impractical to compare each file or other unit of data of each data set against the same unit of data of every other data set to determine the degree to which the two data sets overlap. As such, there is a need to efficiently classify data sets.

BRIEF DESCRIPTION OF THE DRAWINGS

Various embodiments of the invention are disclosed in the following detailed description and the accompanying drawings.

DETAILED DESCRIPTION

Figure 1:
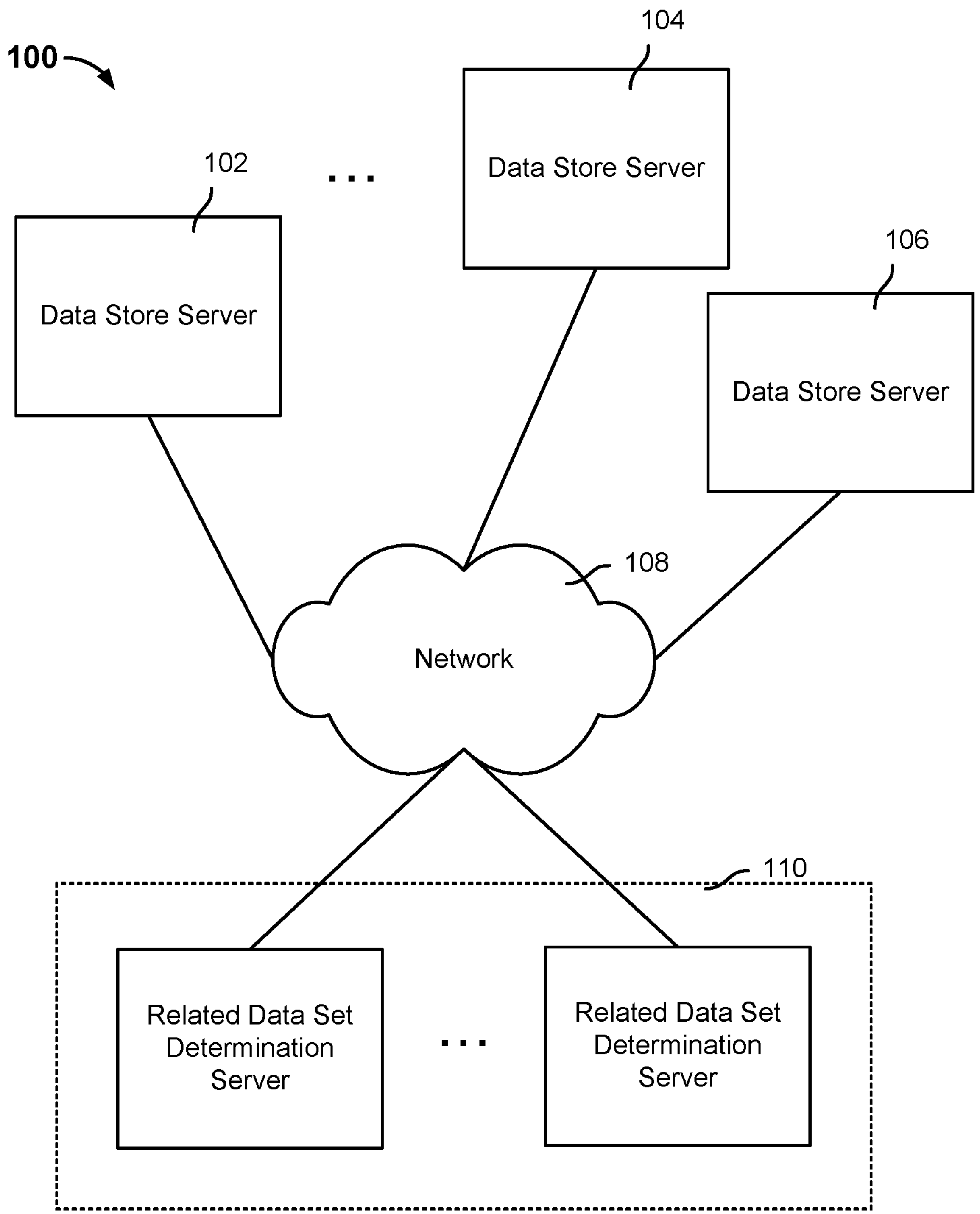
FIG. 1 is a diagram showing an embodiment of a system for the determination of related.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of determining related data sets are described herein. A first plurality of columns belonging to a first data set is analyzed to determine first attributes for each column in the first data set. A second plurality of columns belonging to a second data set is analyzed to determine second attributes for each column in the second data set. In various embodiments, the column name and column values of each column in each of at least two data sets are examined to determine a set of column-specific attributes for each column. For example, a "data set" comprises a table. A set of common columns belonging to the first data set and the second data set is determined by comparing at least a portion of the first attributes for each column in the first data set and at least a portion of the second attributes for each column in the second data set. In various embodiments, a column identifier is generated for each column in each data set as a function of the same predetermined type(s) of attributes. Then, the column identifiers of the columns belonging to the first data set and the second data set are compared. A first data set column and a second data set column that share the same column identifier are considered a "common column." Whether the first data set and the second data set can be included in the same cluster of data sets is determined based on the number of common columns they share, and also the number of common columns that each share with other data sets. Data sets that belong to the same cluster are candidates for being "related." In various embodiments, pairwise comparisons of column-specific attributes are performed among columns among different pairs of data sets in a cluster. Those data sets within a cluster whose pairwise column-specific attributes resulted in a similarity that is greater than a similarity threshold are considered to be "related." As such, related data sets are related by virtue of having a sufficient proportion of columns that are similar according to their column-specific attributes (even if the similar columns contain at least some different column values). Rules can be checked against the current access configurations of related data to ensure that related data sets are similarly treated (e.g., protected).

FIG. 1 is a diagram showing an embodiment of a system for the determination of related. System 100 includes data store server 102, data store server 104, data store server 106, network 108, and multiple instances of related data set determination server 110. Network 108 comprises data and/or telecommunications networks. Data store server 102, data store server 104, data store server 106, and more than one instance of related data set determination server 110 may communicate to each other over network 108. While only two instances of related data set determination server 110 are shown in FIG. 1, in practice, more than two instances of related data set determination server 110 can be operating in parallel to process the great volume of files associated with each data store in accordance with embodiments described herein. "Related data set determination server 110" as used herein could encompass one or more instances of the server and its functionalities.

Each of data store servers 102, 104, and 106 is configured to store data for various customers in data stores. Examples of a data store include a data lake, a database (e.g., a relational database), a key-value storage, or a data warehouse. In various embodiments, each of data store servers 102, 104, and 106 is configured to store data that is organized as columns. Each column of data includes at least a column name as well as column values (e.g., rows of data). In some embodiments, each of data store servers 102, 104, and 106 organizes data into hierarchies. A hierarchy of data may include a tree-shaped organization of data and where files may exist at the leaf nodes (e.g., nodes with no children nodes) and optionally, at non-leaf nodes (e.g., nodes with children node(s)). Examples of files include Parquet files, JSON files, CSV files, Avro files, Orc files, PDF files, XLS files, XLSX files, Doc files, Docs files, PPT files, TXT files, SQL dump files, among others. Examples of hierarchies include tables and directories. In the directory example, each node in the hierarchy/tree is a folder and a folder that is descended from another folder can sometimes be referred to as a "subfolder" of the parent folder. One or more files can be stored at each node/folder of the hierarchy.

In some embodiments, files across data stores such as data store servers 102, 104, and 106 that belong to the same data set have already been determined using any appropriate technique. For example, files across (e.g., nodes of hierarchies of data stored across) data store servers 102, 104, and 106 that share at least some of the same column names are determined to belong to the same data set. After individual data sets are determined, related data set determination server 110 is configured to analyze the columns of the data sets to determine which data sets are related to each other. In some embodiments, data sets that are determined to be related can be treated similarly (e.g., have access to them restricted in the same way so as to consistently protect related data sets), as will be described further below.

Related data set determination server 110 is configured to first determine clusters of data sets and second, within each cluster of data sets, determine those data sets that are related to each other. However, prior to determining clusters of data sets, related data set determination server 110 is configured to analyze each column of data in each (previously determined/obtained) data set to determine a set of column-specific attributes. As will be described in further detail below, specifically, related data set determination server 110 is configured to determine, for each column in a data set, a first set of "stable attributes" comprising attributes that are unlikely to change as values are updated, added, or deleted from that column. In some embodiments, stable attributes of a column are non-statistical/deterministic attributes that are determined based on both the column name and the column values. Examples of stable attributes include a column name classification (e.g., the category of data associated with the column name), a data classification (e.g., the predetermined classifier that yielded the highest score for the column), and a data type (e.g., the format of the data such as string, date, number, etc.). Also, related data set determination server 110 is configured to determine, for each column in a data set, a second set of "non-stable attributes" comprising attributes that are subject to change as values are updated, added, or deleted from that column. In some embodiments, non-stable attributes of a column are statistically computed attributes that are determined by column values. Examples of non-stable attributes include the mean column value, the range of column values, the cardinality of column values, the entropy of column values, the number of rows, the text length, the text length variance, and whether the column values comport with Benford's law. To determine clusters of data sets, related data set determination server 110 is configured to generate a column identifier for each column in each data set as a function of that column's stable attributes. For example, the column identifier of a column is determined as the hash of the deterministic concatenation of its stable attributes (e.g., hash (stable_attribute1, stable_attribute2, stable_attribute3)). Related data set determination server 110 is configured to determine that different data sets that have respective columns with the same column identifier have that column in common. Related data set determination server 110 is configured to then determine which data sets belong to the same cluster based on the number of common columns that data sets in the cluster share with each other. For example, while two data sets in the same cluster may have only a respective subset of their columns in common, the number/proportion of such common columns could cause them to be clustered together (versus clustered into different clusters).

After clustering the data sets, related data set determination server 110 is configured to make pairwise comparisons of column-specific attributes between pairs of data sets within the same cluster to determine which data sets in the cluster are related to each other. Given that data sets have already been grouped into clusters based on common columns, then data sets that belong to the same cluster are candidates for being related to each other. Also, data sets that have been grouped into different clusters are not candidates to be related to each other. Therefore, pairwise comparisons of column-specific attributes between data sets are not performed for data sets that belong to different clusters. For example, to perform pairwise comparisons of columns' column-specific attributes between a column from a first data set to a column of a second data set, related data set determination server 110 is configured to compare a first column-specific attribute associated with the first data set's column to the same type of column-specific attribute associated with the second data set's column (e.g., the mean column values of the two columns are compared), and then to compare a second column-specific attribute associated with the first data set's column to the same type of column-specific attribute associated with the second data set's column (e.g., the range of column values of the two columns are compared), and so forth until all the types of column-specific attributes are compared. After related data set determination server 110 makes pairwise comparisons of columns of data sets within the same cluster based on their respective column-specific attributes, related data set determination server 110 is configured to determine a similarity degree between each pair of data sets in the cluster based on such column-specific attribute comparisons. The pairs of data sets that have a similarity degree that meets or exceeds a threshold similarity degree are determined to be "related" and the pairs of data sets whose similarity degrees are less than the threshold similarity degree are determined not to be related. For example, two or more data sets of a cluster can be determined to be related to each other and a cluster may include at least two data sets that are not related to each other as determined by their pairwise comparison of columns. In some embodiments, in a pairwise comparison of columns from different data sets within a cluster, several column-specific attributes are compared between every pair of columns across the different data sets of the cluster. For example, both stable attributes and non-stable attributes of columns can be compared. As such, given the large number of combinations of pairs of columns to compare and the long list of column-specific attributes to compare, such pairwise comparisons of columns is more rigorous (e.g., computationally expensive) than the comparison of only column identifiers, which was previously performed to cluster the data sets. However, by first clustering the data sets and then only performing such pairwise comparisons of columns among data sets within the same cluster (and not performing the computationally intensive pairwise comparisons of columns among data sets across different clusters), far fewer than all possible pairwise comparisons of columns of all data sets need to be performed. As a result, the initial clustering technique greatly reduces the number of pairwise comparisons of columns that is ultimately performed by limiting the pairwise comparisons to only take place for data sets that have already been determined to include more common columns to each other within the same cluster than other data sets in other clusters.

Once related data sets have been determined, related data set determination server 110 is configured to determine whether any data set that was determined to relate to another data set violates a rule associated with related data sets. As mentioned above, while two related data sets may not have an identical structure (e.g., number of columns, column names) or identical column values, the data sets have columns that are sufficiently similar to warrant similar types of accesses/protections. For example, for two related data sets, one data set is potentially a copy of the other data set. In another example, for two related data sets, one data set is potentially derived/cloned from the other data set. As such, rules can be configured to indicate that access (e.g., by specified users, by specified user roles, by specified services/applications) to related data sets should be similar and/or that the storage location/environments of related data sets should be the same. In some embodiments, related data set determination server 110 is configured to enforce a rule associated with related data sets by comparing the accesses to and/or storage locations/environments of related data sets to determine whether a discrepancy is determined. In the event that a discrepancy is determined, related data set determination server 110 is configured to programmatically provide a remediation such that the violated rule can be enforced. As will be described in further detail below, the remediation is configured to result in the related data sets having access protections and/or storage locations/environments that satisfy the rule.

Figure 2:
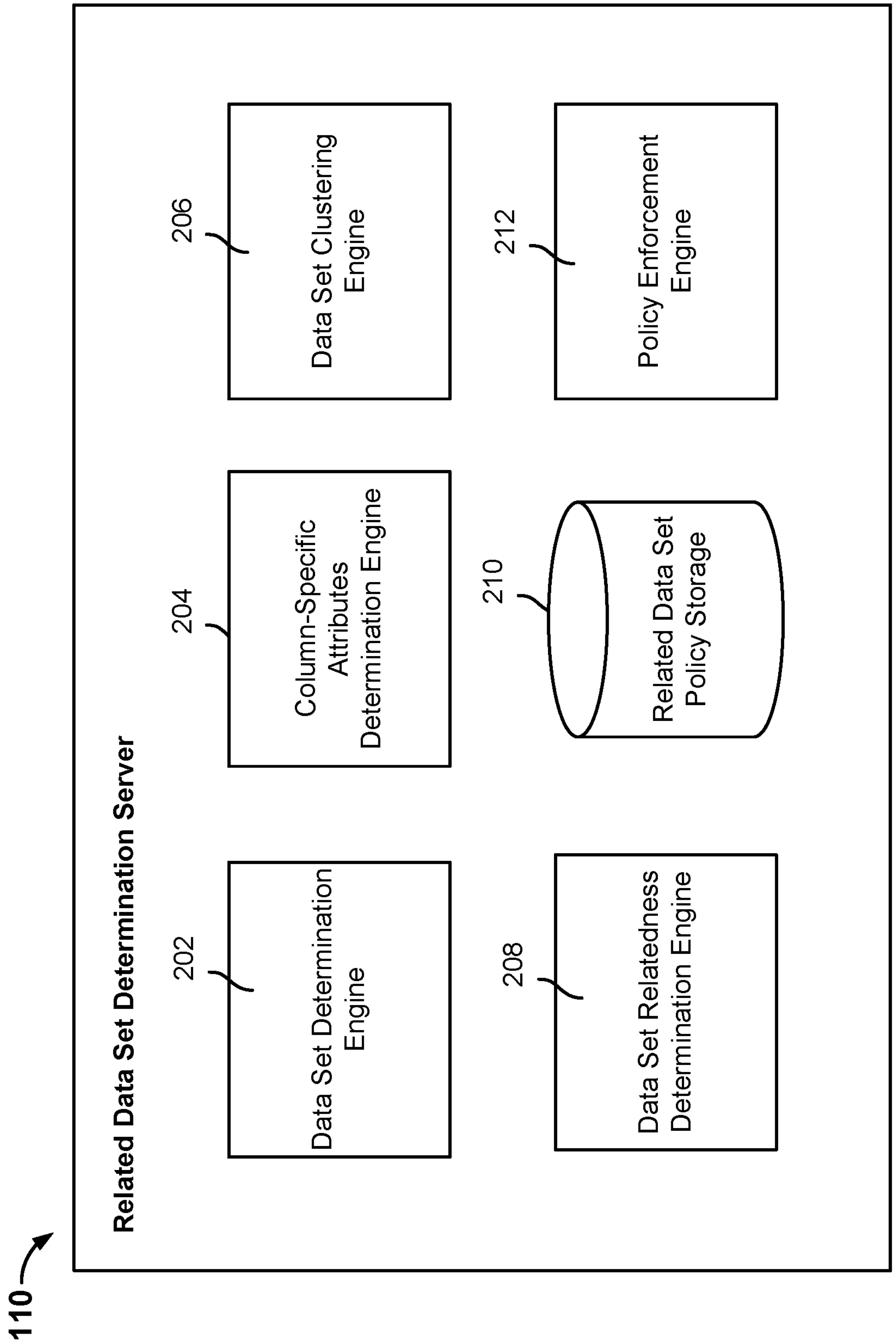
FIG. 2 is a diagram showing an example of a related data set determination server in accordance with some embodiments.

FIG. 2 is a diagram showing an example of a related data set determination server in accordance with some embodiments. In some embodiments, related data set determination server 110 of FIG. 1 can be implemented using the example of FIG. 2. As shown in FIG. 2, the example related data set determination server includes data set determination engine 202, column-specific attributes determination engine 204, data set clustering engine 206, data set relatedness determination engine 208, related data set policy storage 210, and policy enforcement engine 212. In some embodiments, each of data set determination engine 202, column-specific attributes determination engine 204, data set clustering engine 206, data set relatedness determination engine 208, related data set policy storage 210, and policy enforcement engine 212 is determined using hardware and/or software.

Data set determination engine 202 is configured to identify which files at one or more storage locations belong to which data sets. Put another way, data set determination engine 202 is configured to scan through at least some files at one or more storage locations to group files at those location(s) that appear to belong to the same data set. For example, a storage location comprises a data lake or a cloud-based data store. In some embodiments, a storage location comprises a hierarchy of nodes, where files are stored at least in part on at least some of the nodes. The file metadata elements of at least some files across (e.g., different nodes of a hierarchy of) a storage location can be scanned to determine nodes that appear to be part of the same data set. In some embodiments, files located at different nodes, located at different levels within a hierarchy (or even across more than one hierarchy) may be determined to be part of the same data set.

Column-specific attributes determination engine 204 is configured to determine attributes corresponding to each column in each data set (e.g., that was determined by data set determination engine 202). In various embodiments, column-specific attributes determination engine 204 is configured to determine attributes corresponding to each column based on the column's name and the column values that have been stored in the column. In some embodiments, column-specific attributes determination engine 204 is configured to determine two types of attributes for each column: stable attributes (e.g., attributes that are not going to change depending on the column values that are stored at the column) and non-stable attributes (e.g., attributes that are likely going to change depending on the column values that are stored at the column). In some embodiments, any number of stable attributes and any number of non-stable attributes are to be determined for a column. In some embodiments, the stable attributes that are determined for a column include, for example, one or more of the following:

- Name classification. The name classification is a category to which the column name can be mapped. For example, the name classification of a column name can be determined by running the name through a name classifier that would output a corresponding name classification. Some specific examples of name classification include login, phone number, user agent, etc.
- Data classification. The data classification is a category to which the column values can be determined. For example, the data classification of a column can be determined by running the column values of the column through a data classifier that would output a corresponding data classification. Examples of data classifications include social security number, vehicle identification number (VIN), phone number, and email address.
- Data type. The data type is the format/type of data of column values that is stored in the column. For example, the data type of a column can be determined by running the column values of the column through a data type classifier that would output a corresponding data type. Examples of data types include integer, string, date, and number.

In some embodiments, the non-stable attributes that are determined for a column include, for example, one or more of the following:

- Mean. The mean is the mean of the column values in the column.

Range of values. The range of values is the range of the column values in the column.

Cardinality. The cardinality is the number of unique values among the column values in the column.

Entropy. The entropy is the quantification of how much information is present among the column values in the column.

Number of rows. The number of rows is the number of column values that have been stored in the column.

Text length mean. The text length mean is the mean length of the column values in the column.

Text length variance. The text length variance is the variance in the length of the column values in the column.

Benford value. The Benford value describes the relative frequency distribution of leading digits of the column values in the column.

The above are only some example types of stable and non-stable attributes that can be determined for each column. In some embodiments, between 10 to 20 attributes are determined for each column. In some embodiments, the number of attributes that are determined for each column can change as more or fewer attributes are determined to be computed for each column.

Data set clustering engine 206 is configured to cluster the data sets (e.g., that were determined by data set determination engine 202) based on at least some column-specific attributes that were determined for the columns of each data set. In some embodiments, a column identifier is determined for each column of a data set as a function of that column's stable attributes. Specifically, a column identifier is determined for each column of a data set as a hash of that column's stable attributes. For instance, if the stable attributes for Column A of Data Set 1 included stable_attribute1, stable_attribute2, and stable_attribute3, then the column identifier for that column is hash (stable_attribute1, stable_attribute2, and stable_attribute3). Data set clustering engine 206 is configured to determine which columns are common to which data sets based on the columns' respective column identifiers. Put another way, columns of different data sets that share the same column identifier are considered to be a "common column." In some embodiments, data set clustering engine 206 is configured to determine which columns are common to which data sets by storing in a key-value storage, each column identifier as a key and the identifier(s) of data set(s) that include a column with that column identifier as the value corresponding to that key (column identifier). In some embodiments, data set clustering engine 206 is configured to generate a graph (e.g., using the key-value storage) that shows the relationship between common columns (a first set of nodes) and the data sets (a second set of nodes) to which the common columns belong. In some embodiments, the graph of common columns and associated data sets can be output by data set clustering engine 206 at a user interface. In some embodiments, data set clustering engine 206 is configured to determine a percentage overlap between pairs of data sets based on the number of common columns they share over a determined (e.g., mean) number of columns between the two data sets. In some embodiments, data set clustering engine 206 is configured to cluster the data sets based on the graph of common columns and/or the percentage overlap between pairs of data sets. Data sets in the same cluster have more common columns with each other than with other data sets in other clusters. In some embodiments, data set clustering engine 206 clusters data sets according to their common columns using scalable optimization techniques from graph theory and other computer science/applied math domains to solve this combinatorially complex clustering problem. In some embodiments, data set clustering engine 206 is configured to present a visualization of the clusters of data sets (e.g., that is sent to be presented at a user interface of a client device).

In some embodiments, as data sets are updated over time (e.g., as new columns are added to determined data sets), data set clustering engine 206 can perform an updated round of clustering that involves generating column identifiers for each column, matching column identifiers across different data sets, and then clustering data sets based on the number of columns that they share with other data sets.

Data set relatedness determination engine 208 is configured to determine which data sets within a cluster (e.g., as determined by data set clustering engine 206) are related to each other. As described above, data sets are clustered together based on the number of common columns they share. Data sets that are included in the same cluster share more common columns (according to the comparison of column identifiers (e.g., as determined based on a function of each column's stable attributes)) with each other than with data sets in other clusters. As such, a data set is a candidate to be related with other data sets in the same cluster but not a candidate to be related with data sets in different clusters. Put another way, only data sets within the same cluster are then rigorously compared to each other to evaluate which of them are related and data sets that belong to different clusters are determined/presumed to not be related to each other. Data set relatedness determination engine 208 is configured to evaluate the pairwise similarity among pairs of data sets of each cluster to determine which data sets' similarity to each other meet the threshold of being "related." In various embodiments, data set relatedness determination engine 208 is configured to evaluate the similarity between pairs of data sets of each cluster by comparing pairwise column-specific attributes of each column of a data set in a cluster against the column-specific attributes of each column of every other data set in that cluster. In a specific example, in a pairwise comparison of column-specific attributes of columns of two data sets from the same cluster, data set relatedness determination engine 208 is configured to compare each stable attribute (e.g., name classification, data classification, data type) and each non-stable attribute (e.g., mean, range of values, cardinality, entropy, number of rows, text length mean, text length variance, Benford value, etc.) of each column of a first data set to that same type of attribute of each column of a second data set. Then, based on the column-to-column comparisons of column-specific values between the two data sets, data set relatedness determination engine 208 is configured to determine a pairwise similarity value between the two data sets based on the comparisons. If the pairwise similarity value between the two data sets meets or exceeds a threshold pairwise similarity value, then two data sets are determined to be "related" to each other. While pairwise comparison of column-specific attributes of columns of data sets can be a computationally expensive process (due to the number of attributes that need to be compared between every two columns), the number of such pairwise comparisons is drastically reduced thanks to the previous clustering step. This is because clustering provides that pairwise comparison of column-specific attributes of columns only needs to be performed among data sets within each cluster rather than across all data sets (that have been grouped into different clusters).

In some embodiments, data set relatedness determination engine 208 is configured to track which data sets are related to each other so that the related relationship among data sets can be used to enforce rules for related data sets, as will be described below. In some embodiments, in the event that new clusters of data sets are determined by data set clustering engine 206, data set relatedness determination engine 208 is configured to perform another round of determining which data sets are related to each other within each cluster based on the pairwise comparison of column-specific attributes of columns as described above.

In some embodiments, after determining which data sets are related to which other data sets, if any, within the same cluster, data set relatedness determination engine 208 is configured to determine access configurations (e.g., those users, roles, services, and applications, for example, that can access each data set and also the storage location/environment) of each data set. For example, which users, roles, services, and applications can access each data set can be determined based on stored permissions, security configurations, and policies associated with a data owner. In some embodiments, data set relatedness determination engine 208 is configured to output a visualization (e.g., that is sent to be presented at a user interface of a client device) that shows which data sets are related to which other data sets. Optionally, in some embodiments, data set relatedness determination engine 208 is configured to output, in this visualization, the users, roles, services, and applications that can access each data set as well as the storage location/environment of each data set.

Related data set policy storage 210 is configured to store rules to be enforced for data sets that have been determined to be related (e.g., by data set relatedness determination engine 208). In various embodiments, at least some rules stored at related data set policy storage 210 describe that related data sets should meet the same condition(s). For example, a rule for related data sets is that the related data sets should have the same type of protections or limits on which users, roles, services, and applications should be able to access the data sets. As mentioned above, because related data sets are determined to have columns with similar attributes (if not necessarily identical column values), the related data sets could store data of a similar sensitivity and that therefore, data of a comparable/similar sensitivity should be treated/protected similarly.

Policy enforcement engine 212 is configured to determine whether related data sets (e.g., as determined by data set relatedness determination engine 208) violate any rules stored in related data set policy storage 210 and if a rule is violated, generate a remediation. For example, a rule may indicate that if two or more related data sets are stored in storage locations/environments with different restrictions to access, then all the related data sets should have the same protection as the most restrictive storage location/environment. For example, assume that Data Set 1 and Data Set 2 are related. Data Set 1 is stored in the production environment, which is very sensitive and can only be accessed by administrative users. In contrast, Data Set 2 is located within a testing environment that can be widely accessed by users of multiple roles. Because Data Set 1 has more restrictions to access, related Data Set 2 is currently in violation of the rule that if two or more related data sets are stored in storage locations/environments with different restrictions to access, then all the related data sets should have the same protection as the most restrictive storage location/environment. As such, policy enforcement engine 212 could perform a remediation by causing the restrictions of access of Data Set 2 to match those that have been configured to Data Set 1 (e.g., cause Data Set 2 to only be accessible to administrative users). In some embodiments, policy enforcement engine 212 can perform a remediation (e.g., involving increasing the restrictions on accessing a data set) in one or more ways. A first example way for policy enforcement engine 212 to perform a remediation includes to present, at a user interface, recommendations on configuration changes that a user can manually implement to increase the restrictions to access of at least one data set that is related to match those of the most protected data set. A second example way for policy enforcement engine 212 to perform a remediation includes to present, at a user interface, generated computer code snippets that specify the paths/locations for data sets on which the remediation is to be performed and that cause the described type of increase to the restrictions (e.g., restriction of users that can perform access and/or the encryption of data) to access at least one data set that is related to a better protected data set. A user can then copy and paste such computer code snippets to security configuration interfaces (e.g., of data stores) to enforce the desired restriction changes. A third example way for policy enforcement engine 212 to perform a remediation includes to programmatically access the relevant data stores to apply the additional protections on at least one data set that is related to a better protected data set on behalf of the data owner.

Figure 3:
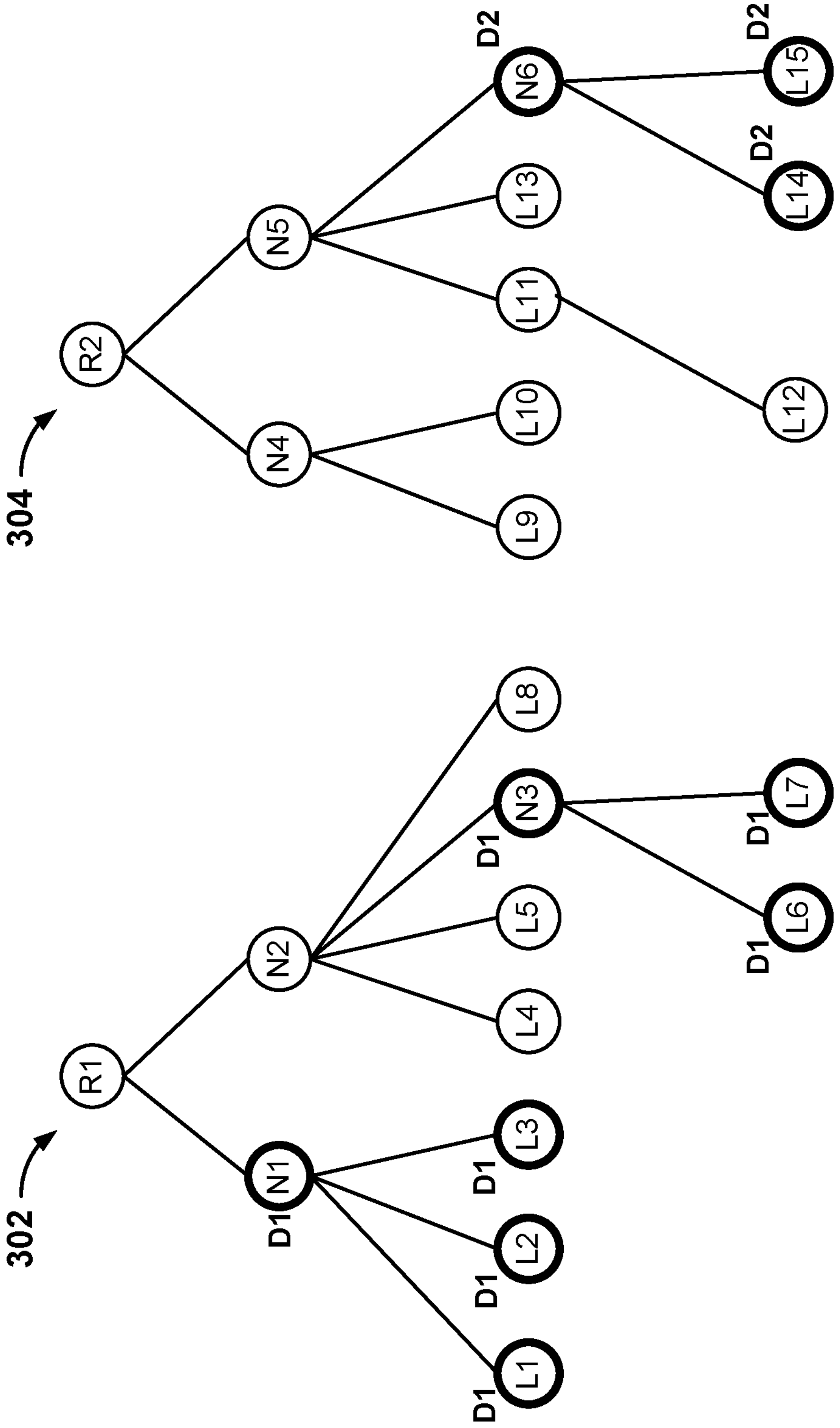
FIG. 3 is a diagram showing example data sets that have been identified at a data store in accordance with some embodiments.

FIG. 3 is a diagram showing example data sets that have been identified at a data store in accordance with some embodiments. In the example of FIG. 3, the data store includes at least hierarchy 302 and hierarchy 304 and where each hierarchy stores files at nodes within the hierarchies. Using any appropriate techniques, files at different nodes within hierarchy 302 and hierarchy 304 can be determined to be part of data sets including Data Set 1 ("D1") and Data Set 2 ("D2"). As shown in the example of FIG. 3, files belonging to the same data set may be located at nodes spread across more than one level of a corresponding hierarchy. For example, files belonging to Data Set 1 were found across nodes N1, L1, L2, L3, N3, L6, and L7 of hierarchy 302. Also, files belonging to Data Set 2 were found across nodes N6, L14, and L15. For example, the locations/paths within each hierarchy of nodes at which files belonging to a data set are found can be stored for that particular data set (e.g., so that updates/remediations to the configurations/access restrictions to files of a data set can be applied to each path/location within a hierarchy of a data store at which the files of that data set are stored). While the example of FIG. 3 shows that files belonging to data sets are stored in hierarchies of files, in other examples, files belonging to data sets can be stored in other arrangements/formats as well.

Figure 4:
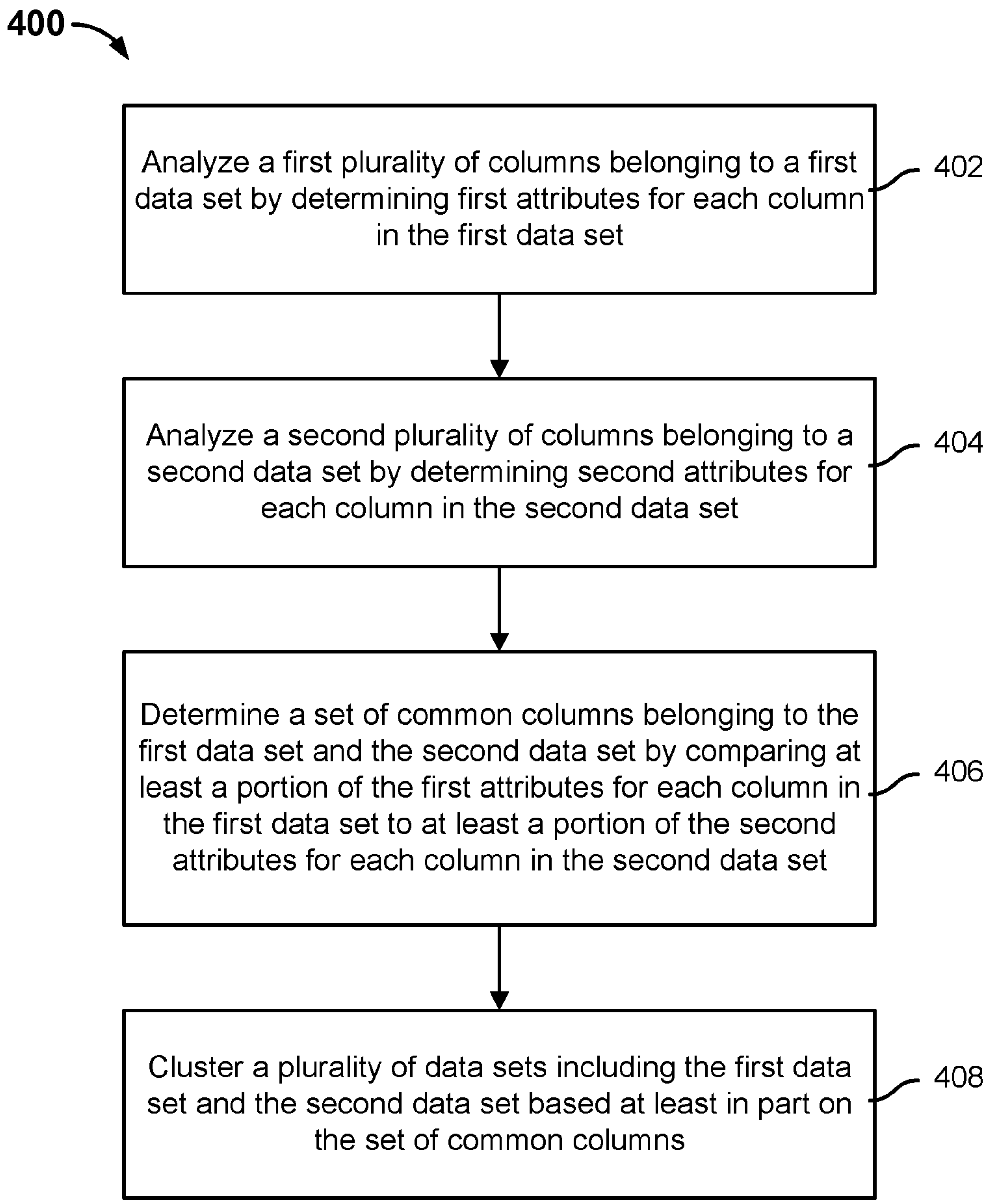
FIG. 4 is a flow diagram showing an embodiment of a process for determining related data sets.

FIG. 4 is a flow diagram showing an embodiment of a process for determining related data sets. In some embodiments, process 400 may be implemented, at least in part, at related data set determination server 110 of FIG. 1.

At 402, a first plurality of columns belonging to a first data set is analyzed by determining first attributes for each column in the first data set. The first data set includes one or more files that each includes one or more columns of data. In various embodiments, column-specific attributes are determined for each column within a first data set. In some embodiments, the column-specific attributes that are determined for each column within the first data set include a set of stable attributes and a set of non-stable attributes, as described above.

At 404, a second plurality of columns belonging to a second data set is analyzed by determining second attributes for each column in the second data set. The second data set includes one or more files that each includes one or more columns of data. In various embodiments, column-specific attributes are determined for each column within a second data set. In some embodiments, the column-specific attributes that are determined for each column within the second data set include a set of stable attributes and a set of non-stable attributes, as described above. The same type of stable attributes and the same type of non-stable attributes are determined for each of the first and second data sets.

At 406, a set of common columns belonging to the first data set and the second data set are determined by comparing at least a portion of the first attributes for each column in the first data set to at least a portion of the second attributes for each column in the second data set. In some embodiments, a column identifier is determined for each column in a data set as a function of at least some column-specific attributes that have been determined for that column. In some embodiments, the column identifier of a column comprises a hash of that column's stable attributes. Specifically, the column identifier of a column comprises an SHA-1 type of hash of that column's stable attributes. As such, the column identifiers of the columns of the first data set are compared to the column identifiers of the columns of the second data set to determine which columns of the first and second data sets share the same column identifiers. A column identifier that can be found among the column identifiers of both the first and second data sets is considered a "common column" relative to the two data sets. Put another way, a common column is considered to be an overlapping column between the first and second data sets. In some embodiments, the number of common/overlapping columns between the first and second data sets is determined.

At 408, a plurality of data sets including the first data set and the second data set is clustered based at least in part on the set of common columns. In some embodiments, the same column identifier-based comparison is performed between the columns of the first data set and data set(s) other than the second data set to determine respective common columns between the first data set and one other data set. In some embodiments, the same column identifier-based comparison is performed between the columns of the second data set and data set(s) other than the first data set to determine respective common columns including the second data set and one other data set. Then the data sets, including the first and second data sets, are clustered based on the respective number/proportion of common columns that they share amongst each other. Clustering will result in data sets that share more common columns with each other than other data sets being grouped into the same cluster.

In some embodiments, data sets that have been grouped into the same cluster are then subject to a more rigorous (e.g., computationally intensive) comparison to each other. Specifically, pairwise comparisons of column-specific attributes between columns of different data sets among the same cluster are performed. The pairwise comparison of column-specific attributes between columns of different data sets of the same clusters include comparing the column-specific attributes (both the stable attributes and the non-stable attributes) of each column of Data Set A to the column-specific attributes of each column of each data set other than Data Set A in the same cluster. A pairwise similarity value is then determined between each pair of data sets in the same cluster. Those pairs of data sets whose respective pairwise similarity values meet or exceed a threshold similarity value are determined to be "related" and are then subject to the enforcement of rules configured for related data sets, as described herein. While data sets that are included in the same cluster may share some column identifier(s) (e.g., which are functions of only stable attributes) and are candidates to being related to each other, the more rigorous pairwise comparisons of column-specific attributes (e.g., which include stable and non-stable attributes) among columns of the data sets of the cluster will determine which of the data sets are actually related to each other. As such, a data set may be determined to be related to zero or more other data set(s) in the same cluster.

Figure 5:
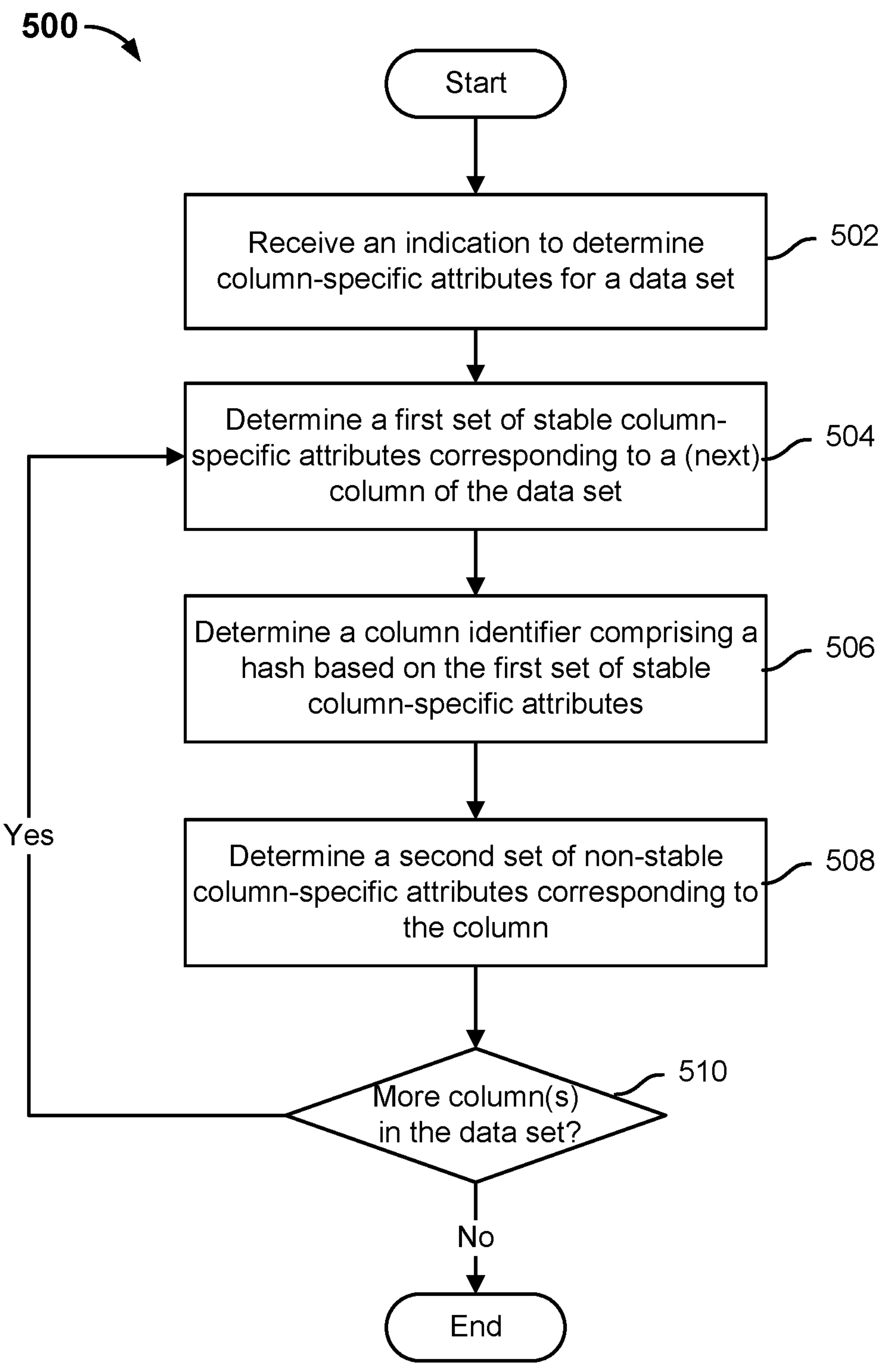
FIG. 5 is a flow diagram showing an example process for determining column identifiers based on column-specific attributes for columns of a data set in accordance with some embodiments.

FIG. 5 is a flow diagram showing an example process for determining column identifiers based on column-specific attributes for columns of a data set in accordance with some embodiments. In some embodiments, process 500 may be implemented, at least in part, using related data set determination server 110 of FIG. 1. In some embodiments, step 406 of process 400 may be implemented, at least in part, by process 500.

Process 500 is an example process for determining column-specific attributes for the columns of a particular data set. For example, to cluster multiple data sets and/or to determine relatedness among those data sets, process 500 can be repeated for each such data set.

At 502, an indication to determine column-specific attributes for a data set is received. For example, in response to a determination to cluster the data sets and/or to determine relatedness among data sets, an indication to determine column-specific attributes can be received for each data set.

At 504, a first set of stable column-specific attributes corresponding to a (next) column of the data set is determined. For each column of the data set, attributes corresponding to a predetermined set of stable types are determined based on the column name and/or column values. As mentioned above, examples of stable attributes include one or more of the following: name classification, data classification, and data type.

At 506, a column identifier comprising a hash based on the first set of stable column-specific attributes is determined. In some embodiments, a hash (e.g., SHA-1) of a deterministic/predetermined order of the stable attributes of the columns is determined and used as the column identifier of that column. For example, if each column has stable attributes stable_attribute1, stable_attribute2, and stable_attribute3, then the column identifier can be determined as the hash of the concatenation of the following sequence: stable_attribute1, stable_attribute2, and stable_attribute3.

At 508, a second set of non-stable column-specific attributes corresponding to the column is determined. For each column of the data set, attributes corresponding to a predetermined set of non-stable types are determined based on the column values. As mentioned above, examples of non-stable attributes include one or more of the following: the mean column value, the range of column values, the cardinality of column values, the entropy of column values, the number of rows, the text length, the text length variance, and whether the column values comport with Benford's law.

At 510, whether there is at least one more column in the data set is determined. In the event that there is at least one more column in the data set for which column-specific attributes have yet to be determined, control is returned to 504 to compute column-specific attributes for the next column in the data set. Otherwise, in the event that there are no more columns in the data set, process 500 ends. If there are other column(s) in the data set for which column-specific attributes have not been determined, then step 504 is returned to for the next column for which column-specific attributes have not yet been determined.

Figure 6:
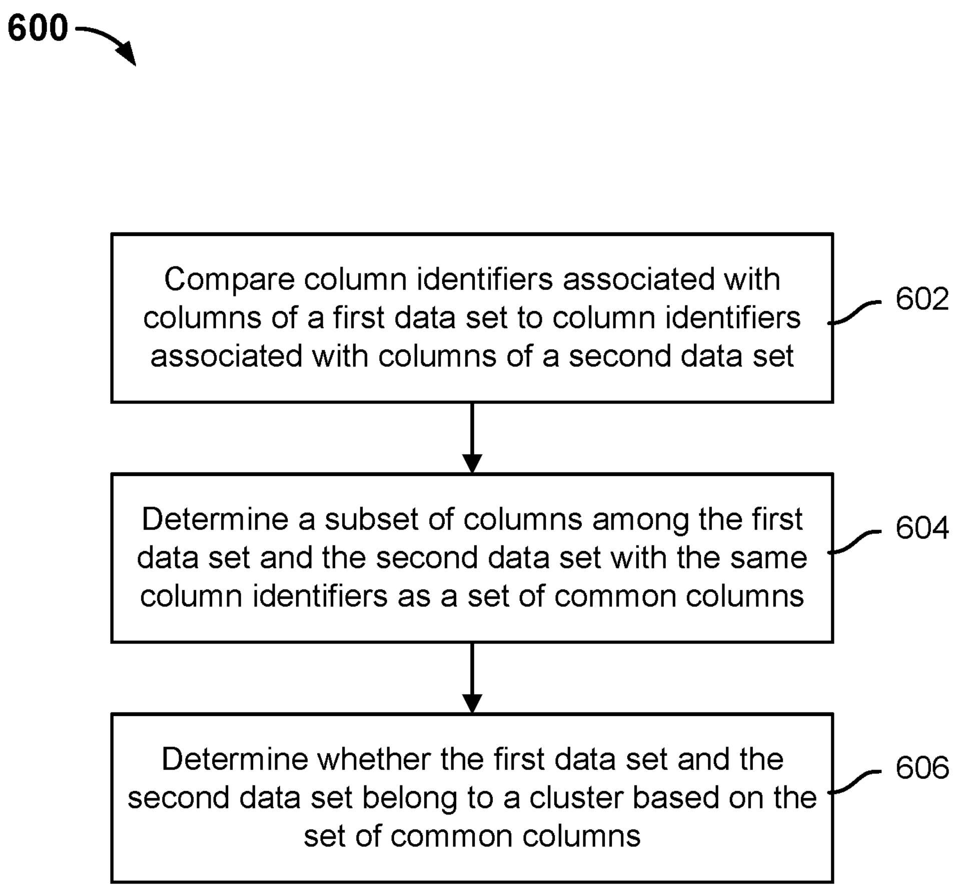
FIG. 6 is a flow diagram showing an example process for determining whether two data sets belong to a cluster in accordance with some embodiments.

FIG. 6 is a flow diagram showing an example process for determining whether two data sets belong to a cluster in accordance with some embodiments. In some embodiments, process 600 may be implemented, at least in part, using related data set determination server 110 of FIG. 1. In some embodiments, steps 404 and 406 of process 400 may be implemented, at least in part, by process 600.

At 602, column identifiers associated with columns of a first data set are compared to column identifiers associated with columns of a second data set. In some embodiments, a column identifier is determined for each column as a hash of that column's stable attributes, as described above. The column identifiers of the two data sets can be compared using any appropriate technique. For example, the column identifiers and the data sets can be represented as nodes in a graph and where an edge can be drawn between a column identifier and a data set if that data set includes a column with that particular column identifier.

At 604, a subset of columns among the first data set and the second data set with the same column identifiers is determined as a set of common columns. A column identifier that is shared by a column from the first data set and a column from the second data set (e.g., in the graph, both the first data set node and the second data set node would have edges connected to this column identifier) is considered as a "common column."

At 606, whether the first data set and the second data set belong to a cluster based on the set of common columns is determined. A larger group of data sets, which includes the first data set and the second data set, is clustered based on the common columns the data sets share among each other. Whether the first data set and the second data set will be clustered into the same cluster depends on the number of common columns they share as well as the number of common columns that each shares with other data sets that are considered in the clustering process. For example, the generated graph of column identifiers and data sets can also be used to determine clusters of data sets based on the edges/connections between data set nodes and column identifier nodes.

Figure 7:
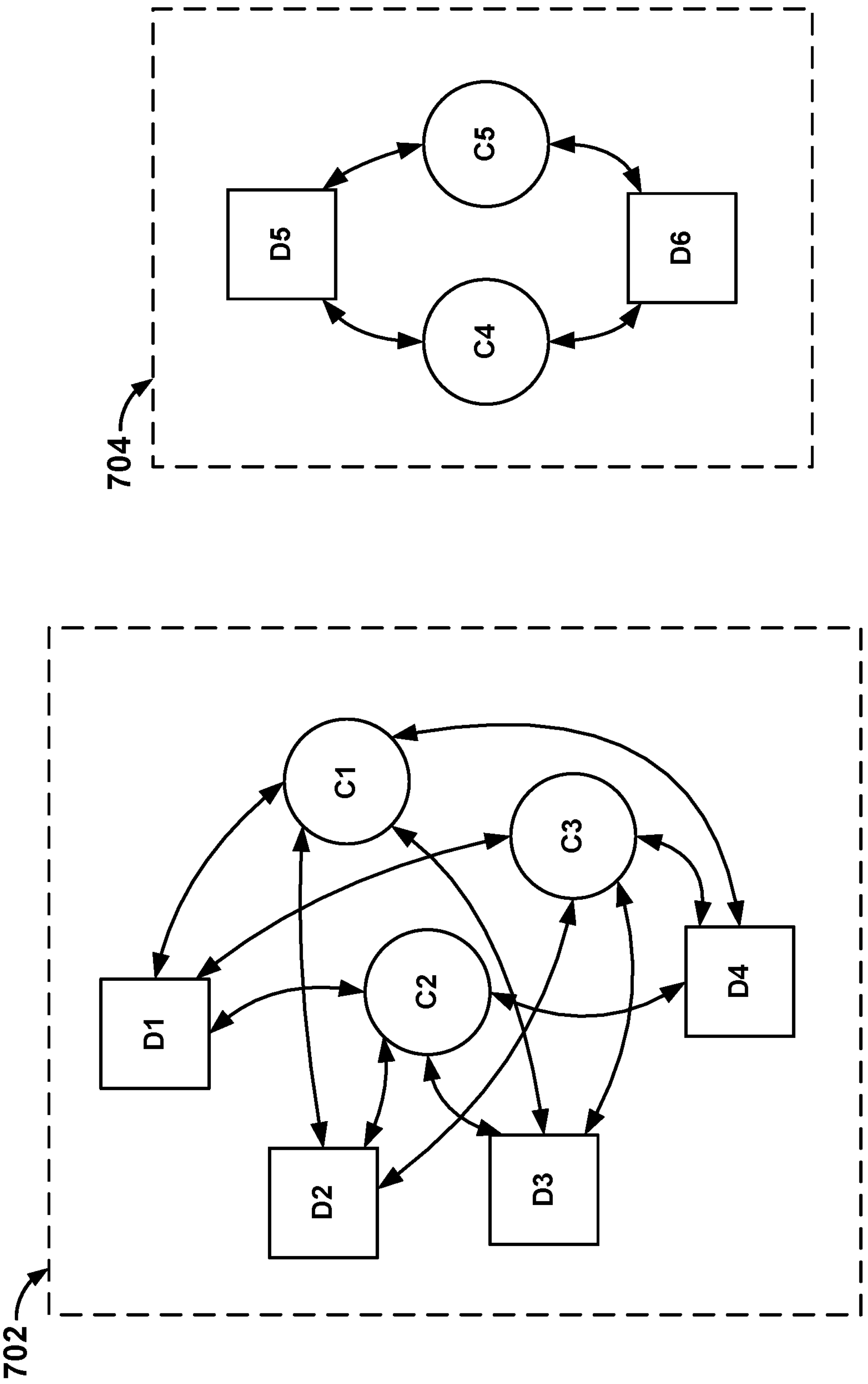
FIG. 7 is an example graph that shows two clusters of data sets and the common column identifiers that are shared by data sets in each cluster in accordance with some embodiments.

FIG. 7 is an example graph that shows two clusters of data sets and the common column identifiers that are shared by data sets in each cluster in accordance with some embodiments. For example, after a process of determining common columns that are shared among data sets using a process such as process 600 of FIG. 6, the graph of FIG. 7 can be determined. In the example graph of FIG. 7, each data set is represented as a square-shaped node that is labeled with a label that starts with "D" and each column identifier is represented as a circle-shaped node that is labeled with a label that starts with "C." Specifically, the graph of FIG. 7 shows Data Sets D1, D2, D3, D4, D5, and D6 and shows Column Identifiers C1, C2, C3, C4, and C5. The graph of FIG. 7 also shows an edge between each data set node and the node of a column identifier that is associated with one of the data set node's columns. In particular, a respective edge exists between each of Data Sets D1, D2, D3, and D4 and each of Column Identifiers C1, C2, and C3, which indicates that each of Data Sets D1, D2, D3, and D4 includes columns with Column Identifiers C1, C2, and C3. Put another way, the columns associated with Column Identifiers C1, C2, and C3 are columns that are common to Data Sets D1, D2, D3, and D4. Furthermore, a respective edge exists between each of Data Sets D5 and D6 and each of Column Identifiers C4 and C5, which indicates that each of Data Sets D5 and D6 includes columns with Column Identifiers C4 and C5. Put another way, the columns associated with Column Identifiers C4 and C5 are columns that are common to Data Sets D5 and D6. Due to the number and/or percentage of common columns that are shared among them, Data Sets D1, D2, D3, D4, D5, and D6 have been divided into two clusters, cluster 702 and cluster 704. Cluster 702 includes Data Sets D1, D2, D3, and D4 and cluster 704 includes Data Sets D5 and D6. (While each of Data Sets D1, D2, D3, D4, D5, and D6 may include columns with column identifiers other than Column Identifiers C1, C2, C3, C4, and C5, these other column identifiers are not shared by other data sets of the same cluster and are therefore excluded from the example graph of FIG. 7 for simplicity).

As described above, data sets that have been sorted into the same cluster are candidates for being related data sets to each other. As such, pairwise comparisons of column-specific attributes are performed between columns of pairs of data sets within each cluster. However, given that clustering already determined which data sets are candidates to be related to each other, pairwise comparisons of column-specific attributes will not need to be performed between columns of data sets across different clusters. Referring back to the example of FIG. 7, pairwise comparisons of column-specific attributes are to be performed among columns of Data Sets D1, D2, D3, and D4 of cluster 702 to determine which two or more Data Sets D1, D2, D3, and D4 are related to each other. Similarly, pairwise comparisons of column-specific attributes are to be performed among columns of Data Sets D5 and D6 of cluster 704 to determine whether Data Sets D5 and D6 are related to each other. However, pairwise comparisons of column-specific attributes do not need to be performed between any column of Data Sets D1, D2, D3, and D4 with any column of Data Sets D5 and D6 because the two sets of data sets belong to different clusters and are therefore presumed to not be related.

Figure 8:
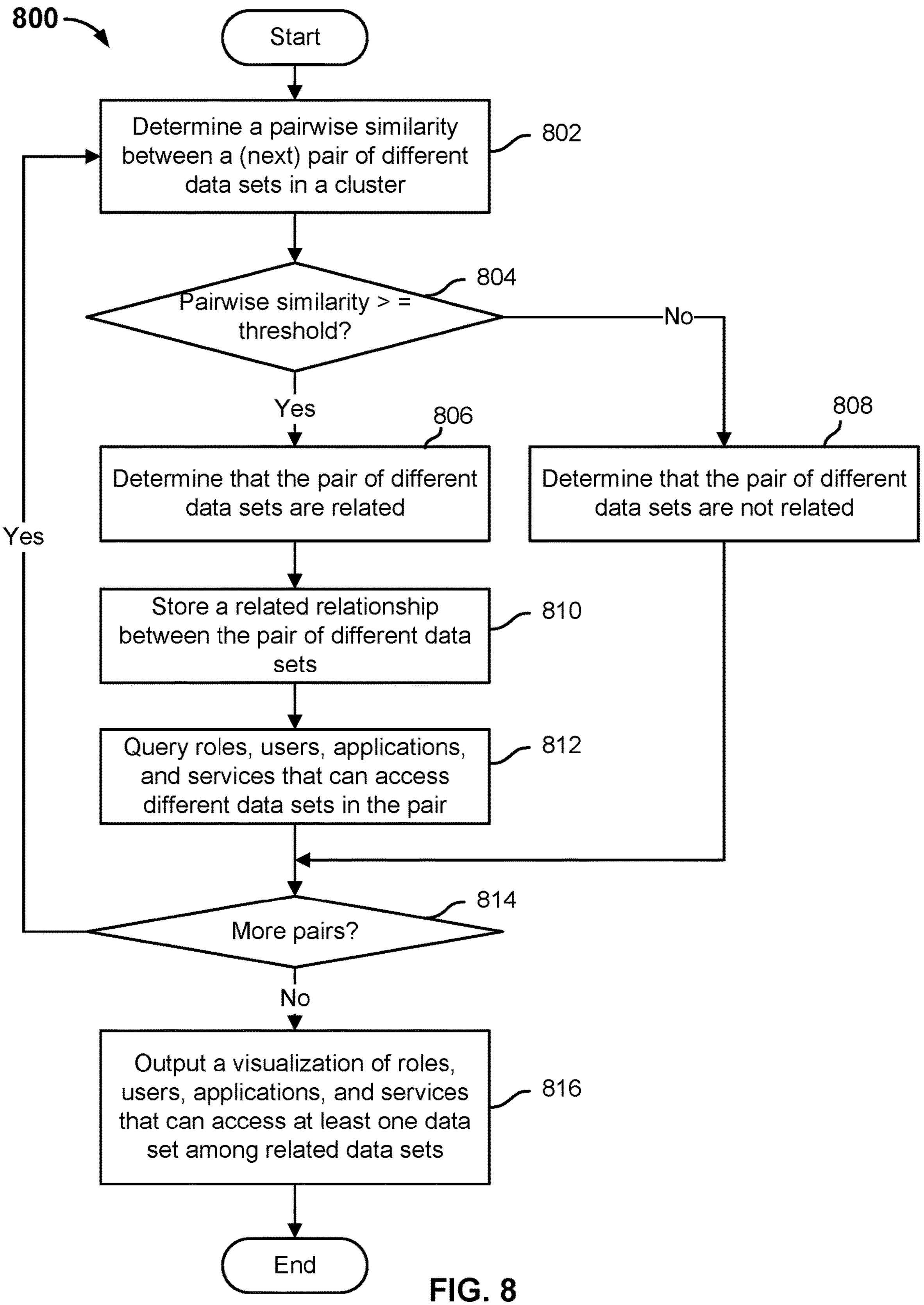
FIG. 8 is a flow diagram showing an example process for determining related data sets in accordance with some embodiments.

FIG. 8 is a flow diagram showing an example process for determining related data sets in accordance with some embodiments. In some embodiments, process 800 is implemented, at least in part, at related data set determination server 110 of FIG. 1.

In some embodiments, process 800 can be performed after process 400 of FIG. 4 determines clusters of data sets. Process 800 can be repeated for each cluster of data sets(s).

At 802, a pairwise similarity between a (next) pair of different data sets in a cluster is determined. In some embodiments, the pairwise similarity between a pair of two different data sets from the same cluster is determined by comparing the column-specific attributes of each column of the first data set of the pair against the column-specific attributes of each column of the second data set of the pair. Column-specific attributes of the same type are compared between columns of the first data set and the second data set of the pair. The respective similarity between column-specific attributes of columns of the first and second data sets are determined to generate an overall pairwise similarity between the two data sets.

At 804, whether the pairwise similarity is equal or greater than a pairwise similarity threshold is determined. In the event that the pairwise similarity is equal or greater than a pairwise similarity threshold, control is transferred to 806. Otherwise, in the event that the pairwise similarity is less than the pairwise similarity threshold, control is transferred to 808. The pairwise similarity is compared to a configured threshold pairwise similarity.

At 806, it is determined that the pair of different data sets are related. If the determined pairwise similarity is equal to or exceeds the threshold pairwise similarity, then the data sets of the pair are determined to be related to each other.

At 808, it is determined that the pair of different data sets are not related. If the determined pairwise similarity is less than the threshold pairwise similarity, then the data sets of the pair are determined to be not related to each other.

At 810, a related relationship between the pair of different data sets is stored. Data indicating which pairs of data sets are related to each other can be stored so that rules can later be evaluated against related data sets.

At 812, roles, users, applications, and services that can access different data sets of the pair are queried. Current security configurations associated with each of the data sets in the pair are analyzed to determine which roles, users, applications, and services can access the data set. In some embodiments, the storage location/environment of each of the data sets in the pair is also determined.

At 814, whether there is at least one more pair of different data sets in the cluster is determined. In the event that there is at least one more pair of different data sets in the cluster, control is returned to 802 to determine whether a next pair of data sets is related. Otherwise, in the event that there are no more pairs of different data sets in the cluster to evaluate, control is returned to 816.

At 816, a visualization of roles, users, applications, and services that can access at least one data set among related data sets is output. Optionally, data sets that are determined to be related to each other along with roles, users, applications, and services (and the locations/environments in which the data sets are stored) can be presented as a visualization that is output (e.g., sent to a client device and presented at a user interface of the client device). The visual representation can provide a user an at a glance overview of the related relationships among data sets and also the types of accesses/environments that are associated with each of the data sets.

In a specific example, assume that a pairwise similarity is to be determined between Data Set D1 and Data Set D2, which were sorted into the same cluster. Data Set D1 includes Columns D1C1, D1C2, and D1C3. Data Set D2 includes Columns D2C1, D2C2, and D2C3. For each column of Data Set D1 and Data Set D2, column-specific attributes Attribute1, Attribute2, Attribute3, Attribute4, and Attribute5 have been determined. In determining the pairwise similarity between Data Set D1 and Data Set D2, the attributes Attribute1, Attribute2, Attribute3, Attribute4, and Attribute5 of a column of Data Set D1 are respectively compared to the attributes Attribute1, Attribute2, Attribute3, Attribute4, and Attribute5 of a column of Data Set of D2 for the following nine pairs of (Data Set D1 column, Data Set D2 column):

(D1C1, D2C1)
(D1C1, D2C2)
(D1C1, D2C3)
(D1C2, D2C1)
(D1C2, D2C2)
(D1C2, D2C3)
(D1C3, D2C1)
(D1C3, D2C2)
(D1C3, D2C3)

The result of comparing the respective column-specific attributes of nine pairs of columns between Data Set D1 and Data Set D2 can be quantified/combined into an overall pairwise similarity value between the pair of Data Set D1 and Data Set D2. The pairwise similarity value between the pair of Data Set D1 and Data Set D2 is then compared to a threshold to determine whether Data Set D1 and Data Set D2 can be considered related or not.

Figure 9:
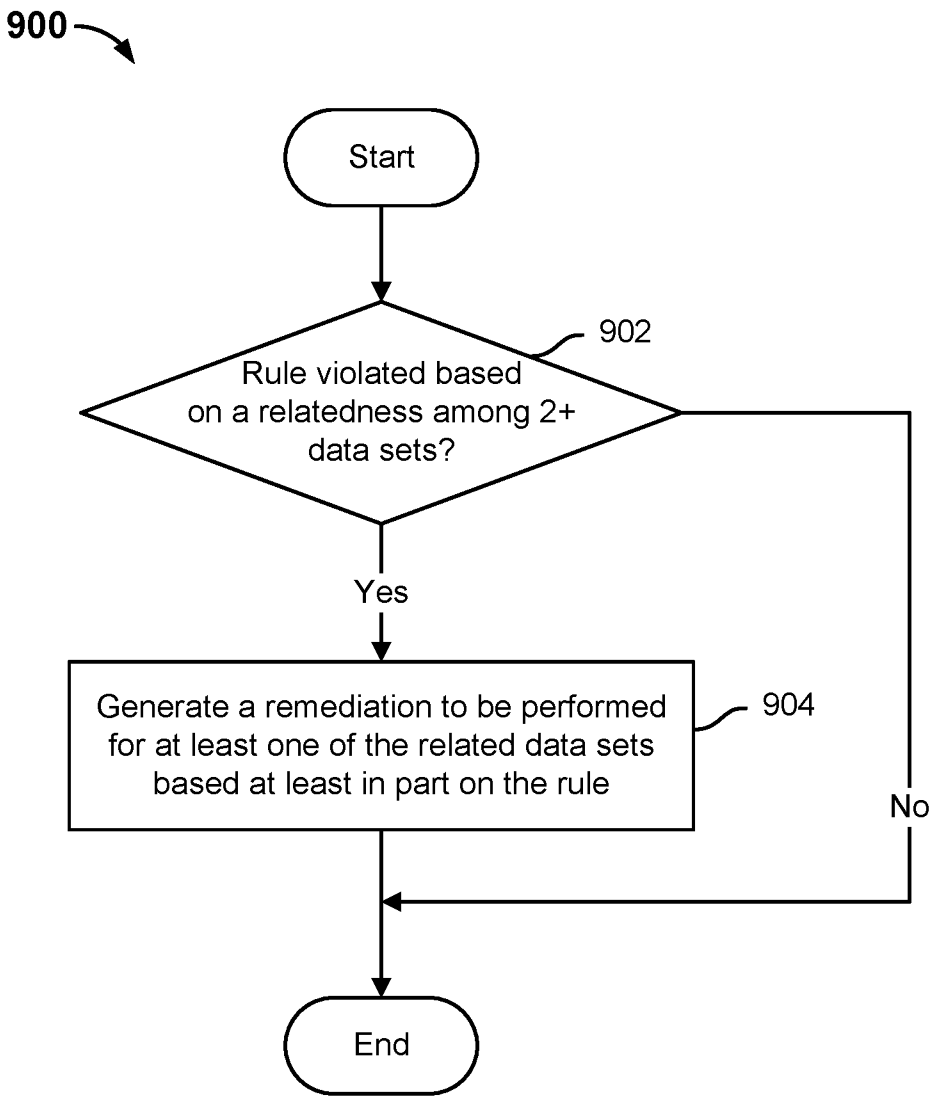
FIG. 9 is a flow diagram showing an example process for enforcing rules of related data sets in accordance with some embodiments.

FIG. 9 is a flow diagram showing an example process for enforcing rules of related data sets in accordance with some embodiments. In some embodiments, process 900 is implemented, at least in part, at related data set determination server 110 of FIG. 1.

At 902, whether a rule was violated based on a relatedness among two or more data sets is determined. In the event that the rule was violated based on the two or more related data sets, control is transferred to 904. Otherwise, in the event that the rule was not violated based on the two or more related data sets, process 900 ends. Rules for related data sets (e.g., data sets that were determined to be related based on a process such as process 800) can prescribe that data sets that are related to each other should have the same restrictions to access, for example. A specific rule is to prescribe that all data sets that are related should have the same restrictions to access as the data set with the most restrictive access. To determine whether a rule is violated, the restrictions to access (e.g., which users, roles, applications, and services can or cannot access each data set; whether the data in each data set is encrypted or not) to each data set of a group of two or more related data sets are determined and if the restrictions to access of one related data set differs from those of another, then a remediation is needed to be performed to ensure that the rule is enforced. The remediation is to modify the restrictions to access of at least one data set in the group of related data sets such that the modified restrictions to access of the at least one data set results in the compliance with the rule. For example, if the rule were that all data sets that are related should have the same restrictions to access as the data set with the most restrictive access, then the remediation could be to modify the access configurations to at least one of the data sets so that the modified restrictions to access would match those of the most protected (e.g., least accessible) data set.

At 904, a remediation to be performed for at least one of the related data sets is generated based at least in part on the rule. The remediation can be accomplished in one or more ways. In a first example way, a recommendation of the types of modifications to access that should be performed for a specified data set is presented at a user interface. The recommendation may include instructions on how to manually implement the changes to the access configurations and to the paths (e.g., in a directory or a hierarchy of data) of files that are associated with the data set(s) to be affected by the change in access. In a second example way, a code snippet includes the paths (e.g., in a directory or a hierarchy of data) of files that are associated with the data set(s) to be affected by the change in access and computer program code that programmatically causes the desired modifications to access configurations for those data sets to be presented at a user interface. An administrative user could then execute the code snippet to have the desired modifications to access configurations for those data sets be programmatically performed. In a third example way, application programming interface (API) calls can be made directly to the data store(s) that store the data set(s) to be affected by the change in access to programmatically modify the access configurations for those data sets at the data store(s).

Figure 10:
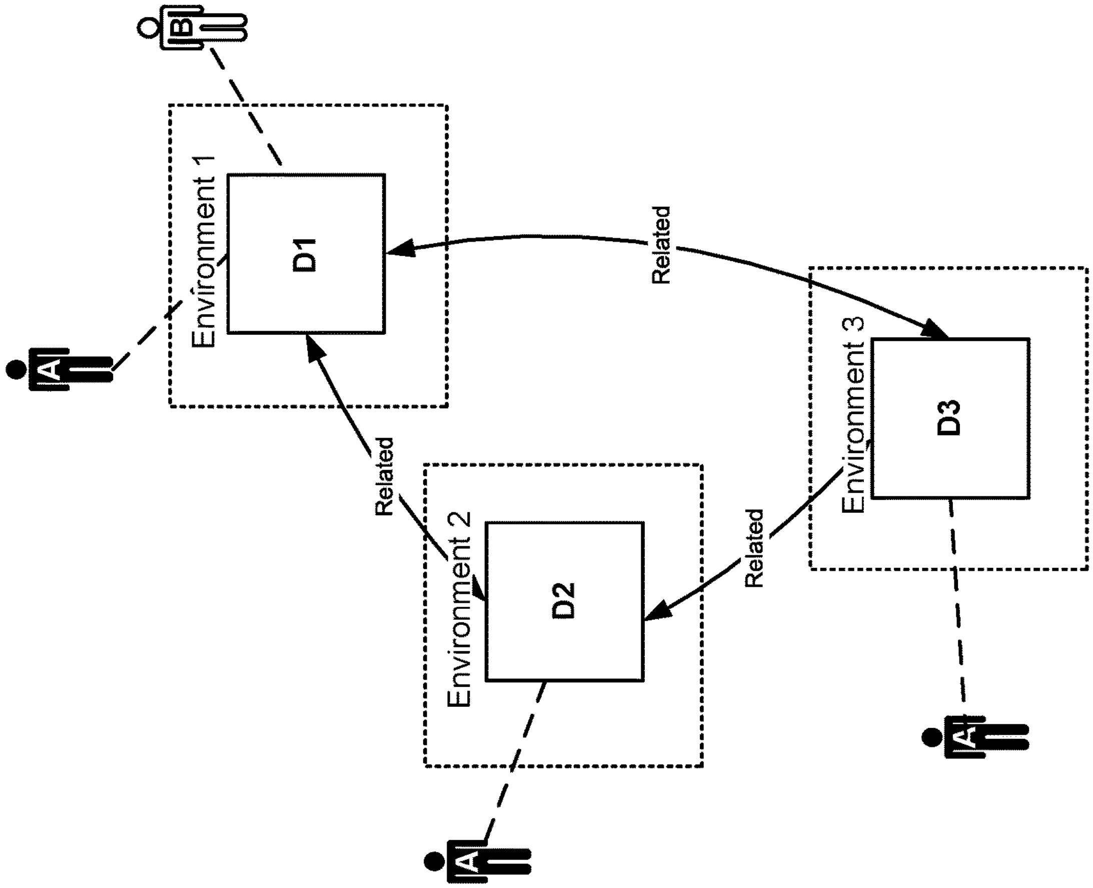
FIG. 10 is a diagram showing an example visualization of related data sets and the respective role(s) that are permitted to access each of them in accordance with some embodiments.

FIG. 10 is a diagram showing an example visualization of related data sets and the respective role(s) that are permitted to access each of them in accordance with some embodiments. FIG. 10 shows three data sets, Data Sets D1, D2, and D3, that have been determined to be related to each other (e.g., by a process such as process 800 of FIG. 8). As such, Data Sets D1, D2, and D3 are shown to be connected to each other. Each of Data Sets D1. D2, and D3 is also shown in FIG. 10 with the respective user role(s) that are currently permitted to access their data. Data Set D1 is accessible by users of Role A and Role B. Data Set D2 is accessible by users of Role A, and Data Set D3 is accessible by users of Role A. Furthermore, each of Data Sets D1, D2, and D3 is also shown in FIG. 10 with the environment in which they are stored. Data Set D1 is stored in Environment 1, Data Set D2 is stored in Environment 2, and Data Set D3 is stored in Environment 3. While not shown in FIG. 10, of the three environments, Environment 3 (e.g., the production environment) is the most sensitive environment of the three and therefore requires the strongest protections for its stored data. For example, Environment 3 requires that its data can be accessed only by users of Role A and should also be encrypted. A visualization such as the one shown in FIG. 10 can provide an at a glance picture of which data sets are related to each other (e.g., despite being stored in potentially different locations) and how such data sets may or may not share similar types of access restrictions.

For example, assume that a rule for related data sets (such as Data Sets D1, D2, and D3) prescribes that all data sets that are related should have the same restrictions to access as the data set with the most restrictive access. In evaluating related Data Sets D1, D2, and D3 against this rule, the current accesses and encryption status of each of Data Sets D1, D2, and D3 are determined. As mentioned above, Environment 3 (in which Data Set D3 is stored) is the most sensitive and therefore restrictive environment among Environments 1, 2, and 3. In particular, Environment 3 requires that its data can be accessed only by users of Role A and should also be encrypted. Because Data Set D1 is accessible to users of both Role A and Role B and its data is not encrypted, the restrictions to access to Data Set D1 is less restrictive than that of Data Set D3 and is therefore in violation of the rule. Furthermore, because Data Set D2 is accessible to users of Role A and its data is not encrypted, the restrictions to access to Data Set D2 is less restrictive than that of Data Set D3 and is therefore in violation of the rule. As such, remediations are needed to be performed with respect to Data Set D1 and Data Set D2 to adjust their respective restrictions to access to match those of Data Set D3. Specifically, a remediation technique is applied for Data Set D1 to encrypt the data (files) of Data Set D1 and to restrict access to Data Set D1 to only users of Role A (i.e., users of Role B will no longer be able to access Data Set D1). Another remediation technique is applied for Data Set D2 to encrypt the data (files) of Data Set D2. As a result of the remediation techniques applied to Data Sets D1 and D2, the two data sets have restrictions to access that match those of Data Set D3 and are therefore in compliance with the example rule.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory; and a processor coupled to the memory and configured to:

analyze a first plurality of columns belonging to a first data set by determining first stable attributes and first non-stable attributes for each column in the first data set, wherein the first stable attributes for each column in the first data set comprises non-statistical attributes associated with one or more values stored in each column in the first data set, wherein the first non-stable attributes for each column in the first data set comprises statistical attributes associated with the one or more values stored in each column in the first data set;

analyze a second plurality of columns belonging to a second data set by determining second stable attributes and second non-stable attributes for each column in the second data set;

analyze a third plurality of columns belonging to a third data set by determining third stable attributes and third non-stable attributes for each column in the third data set;

determine a set of common columns belonging to the first data set and the second data set by comparing first column identifiers determined from the first stable attributes for each column in the first data set to second column identifiers determined from the second stable attributes for each column in the second data set;

determine that the first data set and the second data set belong to a cluster based at least in part on the set of common columns;

determine that the third data set does not belong to the cluster based at least in part on comparing the first column identifiers associated with the first data set to third column identifiers determined from the third stable attributes for each column in the third data set;

in response to the determination that the first data set and the second data set belong to the cluster, determine a first pairwise similarity between the first plurality of columns belonging to the first data set and the second plurality of columns belonging to the second data set by comparing at least the first non-stable attributes for each column in the first data set to at least the second non-stable attributes for each column in the second data set;

in response to the determination that the third data set does not belong to the cluster:

omit determining a second pairwise similarity between at least the first non-stable attributes for each column in the first data set and at least the third non-stable attributes for each column in the third data set; and determine that the first data set and the third data set are not related;

determine that the first data set and the second data set are related based on the determined first pairwise similarity; and in response to the determination that the first data set and the second data set are related:

query a first access configuration associated with the first data set;

query a second access configuration associated with the second data set;

determine that a rule for related data sets is violated based at least in part on a comparison between the first access configuration and the second access configuration, wherein the comparison indicates that the second access configuration is more restrictive than the first access configuration; and in response to a determination that the rule for the related data sets is violated based at least in part on the comparison, provide a remediation by making an application programming interface (API) call to a data store at which the first data set is stored to programmatically modify the first access configuration associated with the first data set to match the second access configuration associated with the second data set, wherein to programmatically modify the first access configuration associated with the first data set comprises to cause the first data set to become encrypted.

2. The system of claim 1, wherein the cluster comprises a first cluster, and wherein the processor is further configured to determine a second cluster comprising at least the third data set and a fourth data set.

3. The system of claim 2, wherein the processor is further configured to omit determining pairwise similarities between the first data set and the fourth data set.

4. The system of claim 1, wherein to determine that the first data set and the second data set are related based on the determined first pairwise similarity comprises to:

compare column-specific attributes of each column of the first data set to column-specific attributes to each column of the second data set;

determine that the first pairwise similarity meets or exceeds a threshold pairwise similarity; and in response to the determination that the first pairwise similarity meets or exceeds the threshold pairwise similarity, determine that the first data set is related to the second data set.

5. The system of claim 1, wherein the processor is further configured to determine a first column identifier corresponding to a first column belonging to the first data set including to:

deterministically order a set of stable attributes; and determine a hash of the deterministically ordered set of stable attributes.

6. The system of claim 1, wherein the first stable attributes comprise one or more of the following: name classification, data classification, and data type.

7. The system of claim 1, wherein the first non-stable attributes comprise one or more of the following: mean, range of values, cardinality, entropy, number of rows, text length mean, text length variance, and Benford value.

8. The system of claim 1, wherein the determination that the second access configuration is more restrictive than the first access configuration is due to users of a specific role having access to the first data set but not the second data set.

9. The system of claim 8, wherein the API call to programmatically modify the first access configuration associated with the first data set to match the second access configuration associated with the second data set further comprises to no longer permit the users of the specific role to have access to the first data set.

10. The system of claim 1, wherein the determination that the second access configuration is more restrictive than the first access configuration is due to the second data set having been encrypted and the first data set having not been encrypted.

11. The system of claim 1, wherein the processor is further configured to output, at a user interface, a visualization showing a relatedness between the first data set and the second data set, a first entity that is permitted to access the first data set, and a second entity that is permitted to access the second data set.

12. The system of claim 11, wherein the first entity comprises a role, a user, a service, or an application.

13. A method, comprising:

analyzing a first plurality of columns belonging to a first data set by determining first stable attributes and first non-stable attributes for each column in the first data set, wherein the first stable attributes for each column in the first data set comprises non-statistical attributes associated with one or more values stored in each column in the first data set, wherein the first non-stable attributes for each column in the first data set comprises statistical attributes associated with the one or more values stored in each column in the first data set;

analyzing a second plurality of columns belonging to a second data set by determining second stable attributes and second non-stable attributes for each column in the second data set;

analyzing a third plurality of columns belonging to a third data set by determining third stable attributes and third non-stable attributes for each column in the third data set;

determining a set of common columns belonging to the first data set and the second data set by comparing first column identifiers determined from the first stable attributes for each column in the first data set to second column identifiers determined from the second stable attributes for each column in the second data set;

determining that the first data set and the second data set belong to a cluster based at least in part on the set of common columns;

determining that the third data set does not belong to the cluster based at least in part on comparing the first column identifiers associated with the first data set to third column identifiers determined from the third stable attributes for each column in the third data set;

in response to the determination that the first data set and the second data set belong to the cluster, determining a first pairwise similarity between the first plurality of columns belonging to the first data set and the second plurality of columns belonging to the second data set by comparing at least the first non-stable attributes for each column in the first data set to at least the second non-stable attributes for each column in the second data set;

in response to the determination that the third data set does not belong to the cluster:

omitting determining a second pairwise similarity between at least the first non-stable attributes for each column in the first data set and at least the third non-stable attributes for each column in the third data set; and determining that the first data set and the third data set are not related;

determining that the first data set and the second data set are related based on the determined first pairwise similarity; and in response to the determination that the first data set and the second data set are related:

querying a first access configuration associated with the first data set;

querying a second access configuration associated with the second data set;

determining that a rule for related data sets is violated based at least in part on a comparison between the first access configuration and the second access configuration, wherein the comparison indicates that the second access configuration is more restrictive than the first access configuration; and in response to a determination that the rule for the related data sets is violated based at least in part on the comparison, providing a remediation by making an application programming interface (API) call to a data store at which the first data set is stored to programmatically modify the first access configuration associated with the first data set to match the second access configuration associated with the second data set, wherein to programmatically modify the first access configuration associated with the first data set comprises to cause the first data set to become encrypted.

14. The method of claim 13, wherein the cluster comprises a first cluster, and further comprising determining a second cluster comprising at least the third data set and a fourth data set.

15. The method of claim 14, further comprising omitting to determine pairwise similarities between the first data set and the fourth data set.

16. The method of claim 13, further comprising determining that the first data set and the second data set are related based on the determined first pairwise similarity comprises:

comparing column-specific attributes of each column of the first data set to column-specific attributes to each column of the second data set;

determining that the first pairwise similarity meets or exceeds a threshold pairwise similarity; and in response to the determination that the first pairwise similarity meets or exceeds the threshold pairwise similarity, determining that the first data set is related to the second data set.

17. The method of claim 13, further comprising determining a first column identifier corresponding to a first column belonging to the first data set including by:

deterministically ordering set of stable attributes; and determining a hash of the deterministically ordered set of stable attributes.

18. The method of claim 13, further comprising outputting, at a user interface, a visualization showing a relatedness between the first data set and the second data set, a first entity that is permitted to access the first data set, and a second entity that is permitted to access the second data set.

19. The method of claim 18, wherein the first entity comprises a role, a user, a service, or an application.

20. A computer program product, the computer program product being embodied in a non-transitory computer-readable storage medium and comprising computer instructions for:

analyzing a first plurality of columns belonging to a first data set by determining first stable attributes and first non-stable attributes for each column in the first data set, wherein the first stable attributes for each column in the first data set comprises non-statistical attributes associated with one or more values stored in each column in the first data set, wherein the first non-stable attributes for each column in the first data set comprises statistical attributes associated with the one or more values stored in each column in the first data set;

analyzing a second plurality of columns belonging to a second data set by determining second stable attributes and second non-stable attributes for each column in the second data set;

analyzing a third plurality of columns belonging to a third data set by determining third stable attributes and third non-stable attributes for each column in the third data set;

determining a set of common columns belonging to the first data set and the second data set by comparing first column identifiers determined from the first stable attributes for each column in the first data set to second column identifiers determined from the second stable attributes for each column in the second data set;

determining that the first data set and the second data set belong to a cluster based at least in part on the set of common columns;

determining that the third data set does not belong to the cluster based at least in part on comparing the first column identifiers associated with the first data set to third column identifiers determined from the third stable attributes for each column in the third data set;

in response to the determination that the first data set and the second data set belong to the cluster, determining a first pairwise similarity between the first plurality of columns belonging to the first data set and the second plurality of columns belonging to the second data set by comparing at least the first non-stable attributes for each column in the first data set to at least the second non-stable attributes for each column in the second data set;

in response to the determination that the third data set does not belong to the cluster:

omitting determining a second pairwise similarity between at least the first non-stable attributes for each column in the first data set and at least the third non-stable attributes for each column in the third data set; and determining that the first data set and the third data set are not related;

determining that the first data set and the second data set are related based on the determined first pairwise similarity; and in response to the determination that the first data set and the second data set are related:

querying a first access configuration associated with the first data set;

querying a second access configuration associated with the second data set;

determining that a rule for related data sets is violated based at least in part on a comparison between the first access configuration and the second access configuration, wherein the comparison indicates that the second access configuration is more restrictive than the first access configuration; and in response to a determination that the rule for the related data sets is violated based at least in part on the comparison, providing a remediation by making an application programming interface (API) call to a data store at which the first data set is stored to programmatically modify the first access configuration associated with the first data set to match the second access configuration associated with the second data set, wherein to programmatically modify the first access configuration associated with the first data set comprises to cause the first data set to become encrypted.

* * * * *